(12) United States Patent
Macken

(10) Patent No.: US 9,202,498 B2
(45) Date of Patent: Dec. 1, 2015

(54) RESISTANCE TEMPERATURE SENSORS POWERED USING READER BOND PAD SHARING

(71) Applicant: Seagate Technology LLC, Cupertino, CA (US)

(72) Inventor: Declan Macken, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 333 days.

(21) Appl. No.: 13/836,124

(22) Filed: Mar. 15, 2013

(65) Prior Publication Data

US 2014/0269838 A1 Sep. 18, 2014

(51) Int. Cl.
*G11B 5/60* (2006.01)
*G01K 13/06* (2006.01)

(52) U.S. Cl.
CPC ............... *G11B 5/607* (2013.01); *G01K 13/06* (2013.01); *G11B 5/6076* (2013.01)

(58) Field of Classification Search
CPC .............................. G11B 5/4813; G11B 21/02
USPC .............................................. 374/183; 360/75
See application file for complete search history.

(56) References Cited

U.S. PATENT DOCUMENTS

| | | | |
|---|---|---|---|
| 4,914,398 A | 4/1990 | Jove et al. | |
| 5,494,473 A | 2/1996 | Dupuis et al. | |
| 5,527,110 A | 6/1996 | Abraham et al. | |
| 5,712,747 A | 1/1998 | Voldman et al. | |
| 5,768,068 A | 6/1998 | Eckberg et al. | |
| 5,850,374 A | 12/1998 | Abraham et al. | |
| 5,896,249 A * | 4/1999 | Fontana et al. | 360/234.5 |
| 6,034,849 A | 3/2000 | Takizawa | |
| 6,052,249 A | 4/2000 | Abraham et al. | |
| 6,347,983 B1 | 2/2002 | Hao et al. | |
| 6,623,330 B2 | 9/2003 | Fukuroi | |
| 6,813,118 B2 | 11/2004 | Pust et al. | |
| 7,088,543 B2 | 8/2006 | Satoh et al. | |
| 7,133,254 B2 | 11/2006 | Hamann et al. | |
| 7,362,534 B1 | 4/2008 | Schreck et al. | |
| 7,446,977 B2 | 11/2008 | Nikitin et al. | |
| 7,466,516 B2 | 12/2008 | Lille | |
| 7,551,406 B1 | 6/2009 | Thomas et al. | |
| 7,643,250 B2 | 1/2010 | Araki et al. | |
| 7,782,568 B2 | 8/2010 | Shiraki et al. | |
| 7,936,538 B1 | 5/2011 | Zhang et al. | |
| 7,969,687 B2 | 6/2011 | Lee et al. | |
| 8,098,450 B2 | 1/2012 | Baumgart et al. | |

(Continued)

OTHER PUBLICATIONS

File History for U.S. Appl. No. 14/050,725.

*Primary Examiner* — Lisa Caputo
*Assistant Examiner* — Jamel Williams
(74) *Attorney, Agent, or Firm* — Hollingsworth Davis, LLC

(57) ABSTRACT

A head transducer comprises a reader coupled to reader bond pads and configured to interact with a magnetic storage medium. A first thermal sensor is configured to produce a first sensor signal. The first sensor is biased relative to a common mode voltage at the reader bond pads. A second thermal sensor is configured to produce a second sensor signal. One of the first and second sensors is situated at or near a close point of the head transducer in relation to the magnetic storage medium, and the other of the first and second sensors spaced away from the close point. Circuitry is configured to combine the first and second sensor signals and produce a combined sensor signal indicative of one or both of a change in head-medium spacing and head-medium contact.

22 Claims, 12 Drawing Sheets

(56) References Cited

U.S. PATENT DOCUMENTS

| | | |
|---|---|---|
| 8,169,751 B2 | 5/2012 | Albrecht et al. |
| 8,297,113 B2 | 10/2012 | Liners et al. |
| 8,310,779 B2 * | 11/2012 | Hanchi et al. ............... 360/75 |
| 8,400,736 B2 | 3/2013 | Greminger et al. |
| 8,804,272 B1 * | 8/2014 | Dakroub et al. ............. 360/75 |
| 8,879,189 B2 * | 11/2014 | Miyamoto et al. ........... 360/55 |
| 8,937,791 B1 * | 1/2015 | Olson et al. ............ 360/234.4 |
| 8,953,275 B2 * | 2/2015 | Chou et al. ................... 360/75 |
| 2007/0035881 A1 | 2/2007 | Burbank et al. |
| 2007/0230056 A1 | 10/2007 | Beach et al. |
| 2009/0195930 A1 | 8/2009 | Lille |
| 2010/0226044 A1 | 9/2010 | Iwase |
| 2012/0113207 A1 | 5/2012 | Zheng |
| 2012/0120519 A1 | 5/2012 | Kunkel et al. |
| 2012/0120522 A1 | 5/2012 | Johnson et al. |
| 2012/0120527 A1 | 5/2012 | Kunkel et al. |

* cited by examiner

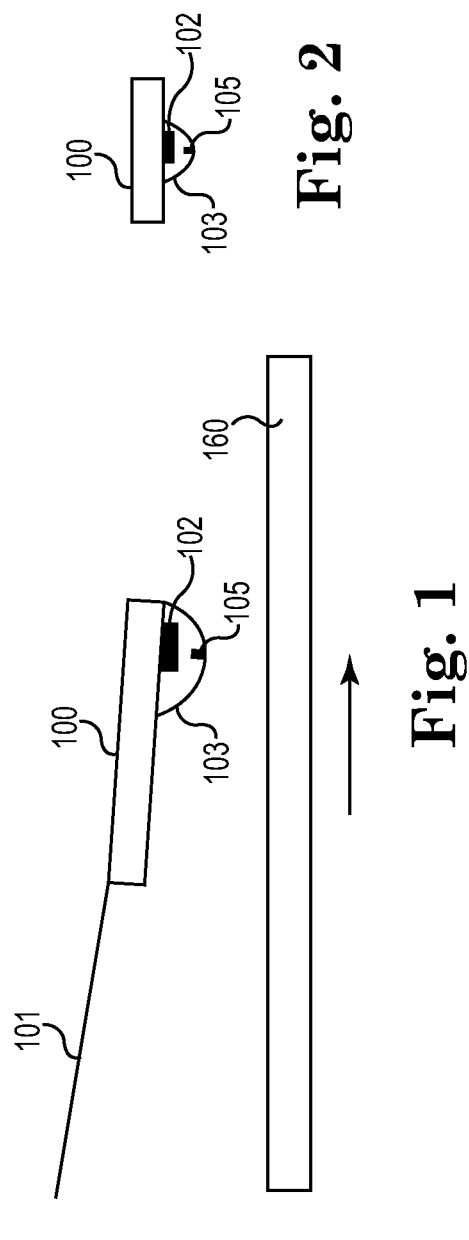

RESISTANCE TEMPERATURE SENSORS POWERED USING READER BOND PAD SHARING

SUMMARY

Embodiments of the disclosure are directed to a head transducer comprising a plurality of disparate components connected to shared bond pads of the head transducer. The components are coupled via circuitry. In some embodiments, a first component is exclusively biased by a differential voltage at the shared bond pads for operation, while other components see a substantially zero potential at the shared bond pads via the circuitry. In other embodiments, each of the plurality of components is exclusively biased by a differential voltage at the shared bond pads for operation at a desired time, while other components see a substantially zero potential at the shared bond pads via the circuitry. In further embodiments, the plurality of components are alternately and exclusively biased by a differential voltage at the shared bond pads for operation at desired times, while other components see a substantially zero potential at the shared bond pads via the circuitry. In some embodiments, a plurality of components are biased relative to a common mode voltage at the shared bond pads for concurrent operation at desired times. In other embodiments, a plurality of components are biased relative to a differential voltage at the shared bond pads for concurrent operation at desired times.

Embodiments of the disclosure are directed to a head transducer comprising a component connected to bond pads and configured for operation in response to a biasing voltage at the bond pads. A sensor is connected to the component's bond pads and configured to produce a sensor signal. Biasing circuitry is coupled to the component and the sensor. In some embodiments, the biasing circuitry is configured to alternately bias the component and the sensor for alternate operation of the component and sensor. In other embodiments, the biasing circuitry is configured to bias the component and the sensor for concurrent operation.

In accordance with various embodiments, an apparatus includes a head transducer comprising a reader connected to reader bond pads and configured to interact with a magnetic storage medium. A sensor is connected to the reader bond pads and configured to produce a sensor signal. Biasing circuitry is coupled to the reader and the sensor. The biasing circuitry is configured to alternately bias the reader and the sensor for reading and sensing operations, respectively.

According to other embodiments, an apparatus includes a head transducer comprising a reader coupled to reader bond pads and configured to interact with a magnetic storage medium. A first thermal sensor is configured to produce a first sensor signal. The first sensor is biased relative to a common mode voltage at the reader bond pads. A second thermal sensor is configured to produce a second sensor signal. One of the first and second sensors is situated at or near a close point of the head transducer in relation to the magnetic storage medium, and the other of the first and second sensors spaced away from the close point. Circuitry is configured to combine the first and second sensor signals and produce a combined sensor signal indicative of one or both of a change in head-medium spacing and head-medium contact.

In some embodiments, the first and second thermal sensors are biased relative to a common mode voltage at the reader bond pads. In other embodiments, during a read operation, a voltage across the first and/or second sensor is substantially zero and, during a spacing measurement or contact detection, a voltage across the reader is substantially zero. In other embodiments, the circuitry is configured to facilitate concurrent biasing of the reader and the first and/or second thermal sensor via a differential voltage at the reader bond pads.

In accordance with various embodiments, a method involves, with a head transducer comprising a reader coupled to reader bond pads and moving relative to a magnetic storage medium, biasing a first thermal sensor of the head transducer relative to a common mode voltage at the reader bond pads, and measuring a change in temperature using a sensor signal produced by the first thermal sensor.

In accordance with various embodiments, a method involves, with a head transducer comprising a reader coupled to reader bond pads and moving relative to a magnetic storage medium, biasing a first thermal sensor of the head transducer relative to a common mode voltage at the reader bond pads, and detecting one or both of a change in head-medium spacing and head-medium contact using a sensor signal produced by the first thermal sensor.

In some embodiments, biasing the first thermal sensor comprises exclusively biasing the first thermal sensor relative to a common mode voltage at the reader bond pads at times when the reader is not needed for a read operation. Other embodiments involve sensing for a change in temperature due to factors other than head-medium spacing change and head-medium contact using a second thermal sensor at the transducer head, producing a first sensor signal by the first thermal sensor and a second sensor signal by the second thermal sensor, and detecting one or both of the change in head-medium spacing and head-medium contact using the first and second sensor signals.

These and other features and aspects of various embodiments may be understood in view of the following detailed discussion and accompanying drawings.

BRIEF DESCRIPTION OF THE DRAWINGS

FIG. 1 is a simplified side view of a heater-actuated head transducer arrangement which incorporates a thermal sensor in accordance with various embodiments;

FIG. 2 is a front view of the heater-actuated head transducer arrangement shown in FIG. 1;

FIG. 3 shows the heater-actuated head transducer arrangement of FIGS. 1 and 2 in a pre-actuated configuration and an actuated configuration;

DETAILED DESCRIPTION

Figure 4A:
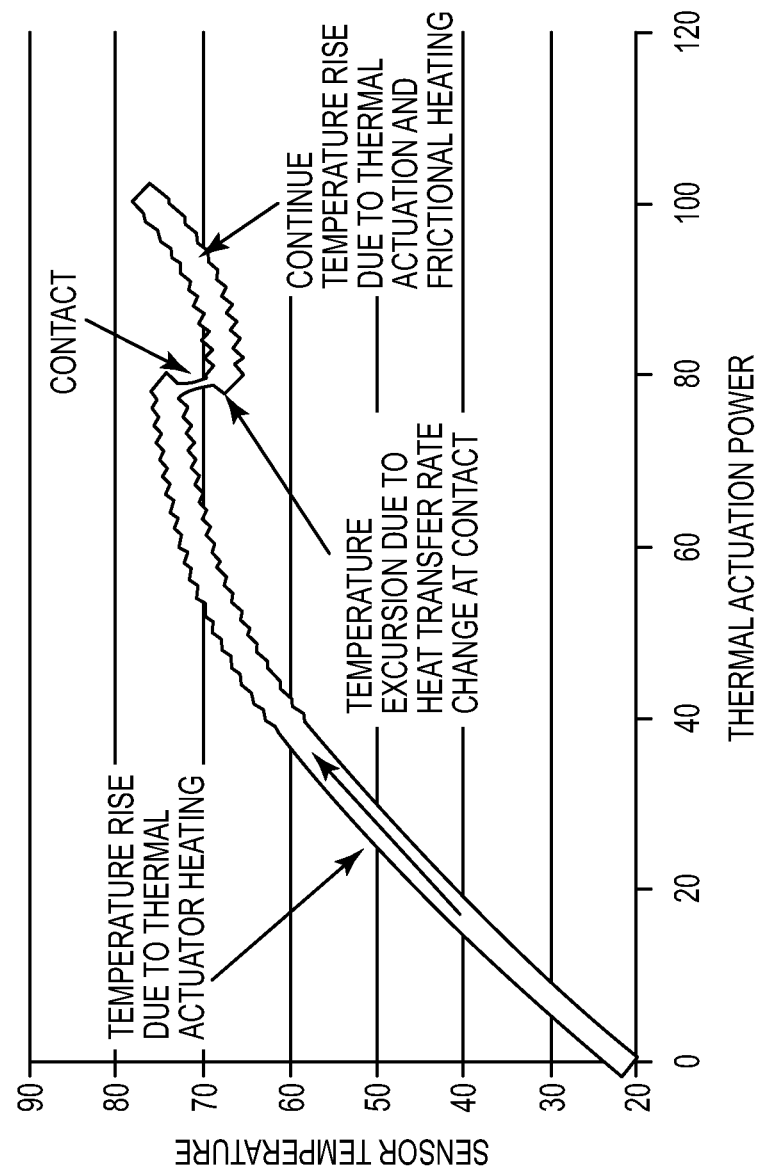
FIG. 4A illustrates a representative temperature profile for a heater-actuated head transducer of the type shown in FIGS. 1-3 before, during, and after contact between the head transducer and a surface of a magnetic storage medium.

Data storage systems commonly include one or more head transducers that write and read information to and from a magnetic storage medium. It is typically desirable to have a relatively small distance or spacing between a head transducer and its associated medium. This distance or spacing is known as "fly height" or "head-media spacing." By reducing the head-media spacing, a head transducer is typically better able to both write and read data to and from a medium. Increasing areal density requires reduced head-to-media spacing. Reducing the head-media spacing also allows for surveying of magnetic storage medium topography, such as for detecting asperities and other features of the medium surface.

Head-media contact detection and/or head-media spacing sensing technologies are important for the performance and reliability of magnetic storage systems. Higher contact detection repeatability enables lower active clearance, and thus higher recording density. Higher contact detection sensitivity reduces wear and improves reliability.

A typical head transducer incorporates several distinct electrical and, in some implementations, optical components that require specified voltages/currents to operate properly. Representative examples of such electrical head transducer components include a reader, a reader heater, a writer, and a write heater, among other possible components. Each of the electrically activated components of a head transducer is electrically coupled to corresponding electrical contacts or bond pads of the head transducer. Depending on the particular design of a given head transducer, the head's various bond pads can be configured as voltage sources, current sources, and ground contacts. Because bond pads take up appreciable space on a head transducer and adding bond pads can be very expensive due to changes in design and fabrication processes needed to accommodate such additional bond pads, it is desirable to minimize both the number of bond pads and changes to the bond pad configuration of a head transducer.

Embodiments of the disclosure relate to a head transducer that incorporates one or more additional electrical components without need for additional electrical contacts or bond pads. Embodiments of the disclosure relate to a head transducer that incorporates one or more additional electrical components that can operate in conjunction with one or more existing electrical components of the head transducer without need for additional electrical bond pads. Some embodiments are directed to a head transducer that incorporates one or more additional electrical components that can share existing bond pads with one or more existing electrical components of the head transducer. Other embodiments are directed to a head transducer that incorporates one or more additional electrical components that can share existing bond pads with one or more existing electrical components of the head transducer and operate alternately with respect to the one or more existing electrical components. Further embodiments are directed to a head transducer that incorporates one or more additional electrical components that can share existing bond pads with one or more existing electrical components of the head transducer and operate concurrently with respect to the one or more existing electrical components.

In accordance with various representative embodiments, a head transducer incorporates one or more thermal sensors without need for additional electrical bond pads. In various embodiments, a head transducer incorporates one or more thermal sensors configured to receive a bias voltage or current from existing bond pads of the head transducer without interfering with the operation of an existing electrical component coupled to the same bond pads. In some embodiments, a head transducer incorporates one or more thermal sensors configured to operate using a DC bias from existing bond pads of the head transducer alternately with respect to an existing electrical component coupled to the same bond pads. Embodiments of the disclosure are directed to use of an existing bond pad in a sharing arrangement to enable operation of one or more thermal sensors of a head transducer in a pad neutral way.

According to various embodiments, the reader of a head transducer is configured to normally operate using a DC bias provided by reader bond pads. One or more thermal sensors can be attached to the reader bond pads to supply a DC bias for the thermal sensor(s). In some embodiments, a DC bias can be alternately switched between the reader and one or more thermal sensors, such that current flows only in the reader during read operations and only in the thermal sensor(s) when contact detecting. Embodiments of the disclosure allow for addition of multiple thermal devices to the head transducer architecture, without addition of further bond pads. This can be achieved by temporarily borrowing the reader bond pads during contact detection. By means of suitable biasing, a potential difference can be maintained exclusively on the reader when reading. Similarly, a potential difference can be maintained exclusively on the thermal sensor(s) when contact detecting or thermal asperity detecting.

In accordance with various embodiments, and with reference to FIGS. 1-3, a slider 100 is shown supported by a suspension 101 in close proximity to a rotating magnetic storage medium 160. The slider 100 supports a head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-media spacing 107 in a data storage system. It is noted that, in some embodiments, a non-thermal actuator can be used to reduce the head-media spacing 107.

A temperature sensor 105 is shown situated on the head transducer 103 at or near the close point. As discussed previously, actuation of the head transducer 103 can be realized by a thermal actuator, such as the heater 102, or other actuator (e.g., a writer). Bias power is applied to the temperature sensor 105 to raise the surface temperature of the sensor 105 and adjacent portion of the head transducer 103 to be substantially higher than the temperature of the magnetic storage medium 160.

The temperature sensor 105 is preferably configured to sense changes in heat flow for detecting onset of head-medium contact. Details concerning head-media spacing and contact determinations in accordance with various embodiments of the disclosure are provided in commonly owned, co-pending U.S. Patent Application Publication Nos. 2012/0113207 and 2012/0120522, which are hereby incorporated herein by reference.

As is depicted in FIG. 3, before head-media contact, there is an air gap 107 defined between the hot head surface and the relatively cool disk 160. The head transducer 103, air gap 107, and magnetic storage medium 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the temperature sensor 105 on the head transducer 103 senses a drop of temperature or an excursion of temperature trajectory, allowing for detection of head-media contact. Alternatively, the temperature sensor 105 can be cooled at reduced bias and witness a heating induced by friction upon contact.

FIG. 4A illustrates a representative temperature profile for a head transducer 103 of the type shown in FIGS. 1-3 before, during, and after contact between the head transducer 103 and a surface of the magnetic storage medium 160. In this illustrative example, the temperature profile is represented as a steady state DC signal due to the low- or non-modulation head-to-disk interface. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario. When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

Figure 4B:
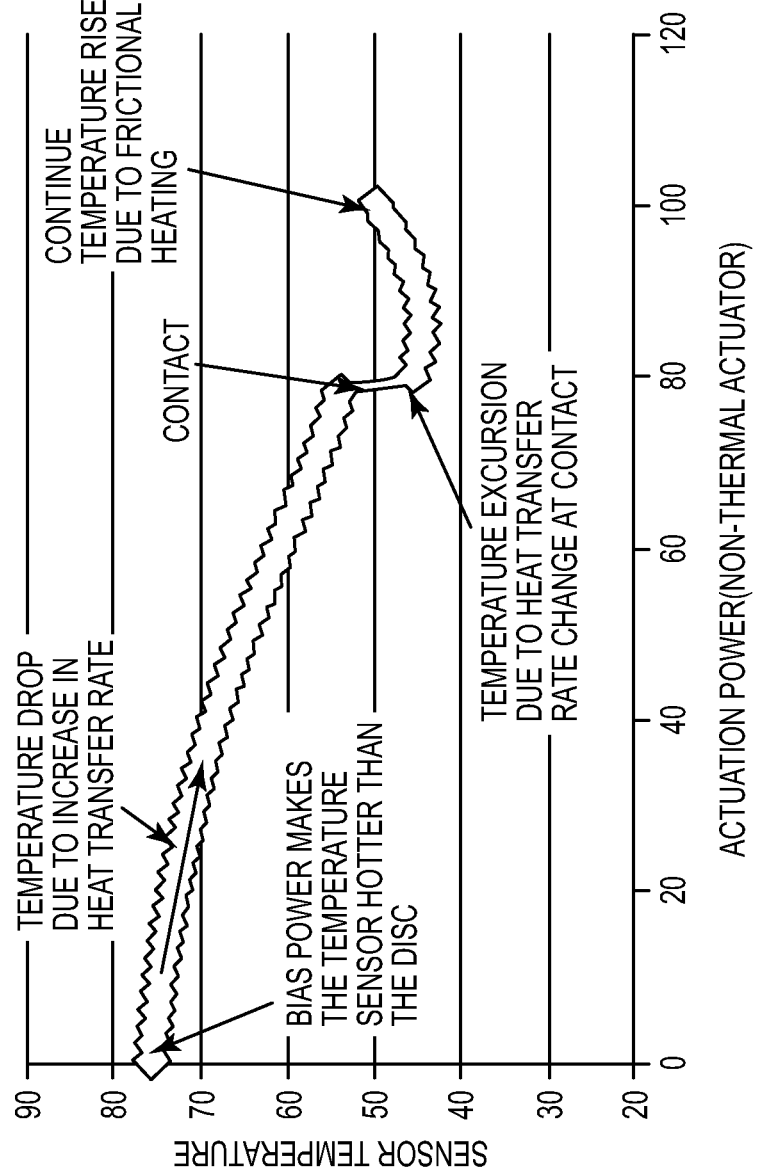
FIG. 4B illustrates a representative temperature profile for a non-thermal actuated head transducer of the type shown in FIGS. 1-3 before, during, and after contact between the head transducer and a surface of a magnetic storage medium.

FIG. 4B illustrates a representative temperature profile for a head transducer 103 which is actuated by a non-thermal actuator. In this illustrative example, the temperature sensor 105 bias power self-heats the temperature sensor 105 to cause an increase in a temperature at the head-to-disk interface to be substantially higher than the temperature of the disk 160. The disk 160 acts as a heat sink in this scenario. When the head transducer 103 is actuated down toward the disk 160, the heat transfer rate increases gradually, causing a gradual decrease in the temperature of the sensor 105. When the head transducer 103 comes into contact with the disk 160, there will be a change in heat transfer rate, causing a head transducer surface temperature excursion. The temperature sensor 105 on the head transducer surface measures this temperature excursion to detect head-media contact. Should further actuation into head-media contact occur, the temperature will eventually increase due to frictional heating.

Figure 5:
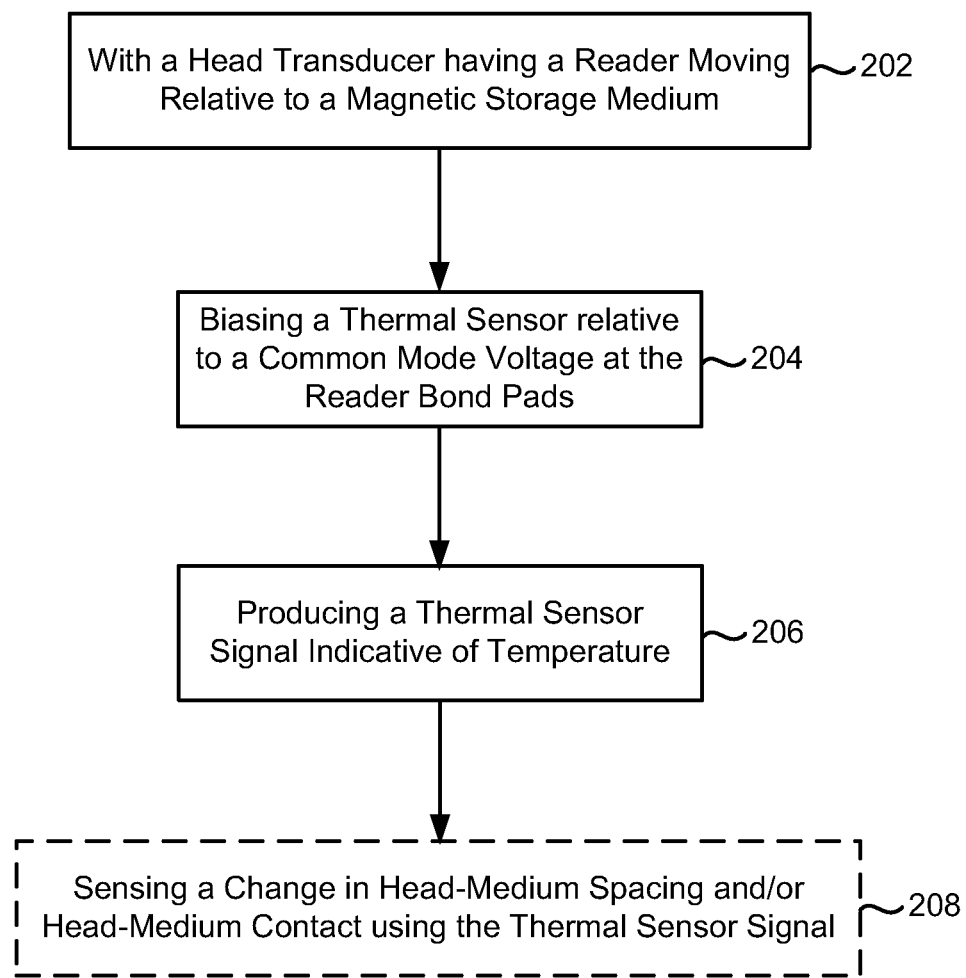
FIGS. 5 and 6 are flow charts showing various processes of methods for measuring temperature at a head transducer using a thermal sensor in a pad neutral manner according to various embodiments.

Turning now to FIG. 5, there is illustrated a method of detecting temperature at a head transducer in accordance with various embodiments. The method according to the embodiment shown in FIG. 5 involves a head transducer having a reader moving 202 relative to a magnetic storage medium. The method involves biasing 204 a thermal sensor at the head transducer relative to a common mode voltage at the reader bond pads, and producing 206 a thermal sensor signal indicative of temperature. In some embodiments, the method shown in FIG. 5 additionally involves sensing 208 a change in head-medium spacing and/or head-medium contact using the thermal sensor signal.

Figure 6:
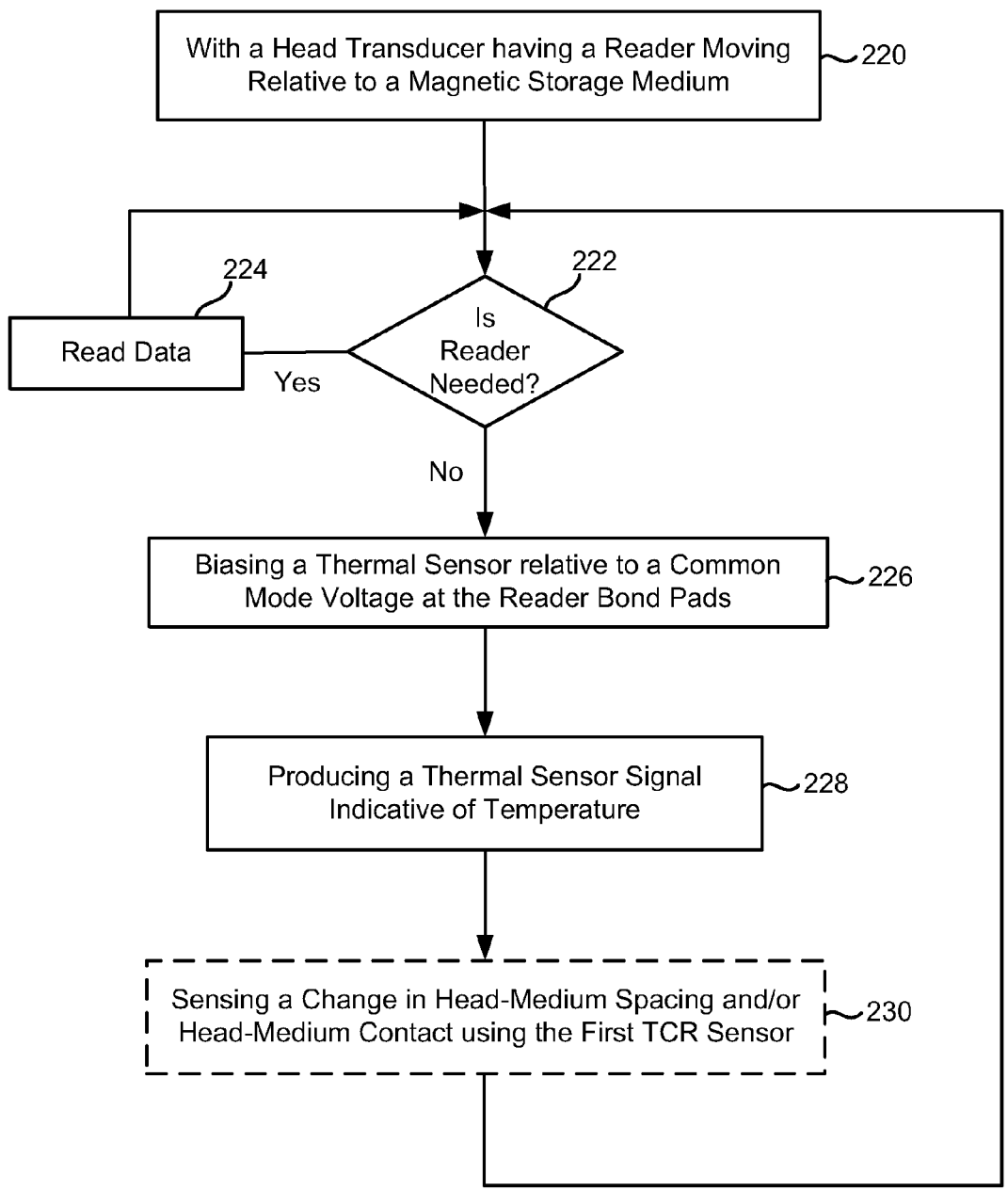

FIG. 6 illustrates a method of detecting temperature at a head transducer in accordance with other embodiments. The method according to the embodiment shown in FIG. 6 involves a head transducer having a reader moving 220 relative to a magnetic storage medium, and a check 222 to see if the reader is needed for reading data or other use (e.g., clearance testing). If the reader is needed, the appropriate voltage is applied to the reader to implement a read operation 224. If the reader is not needed, a thermal sensor at the head transducer is biased 226 relative to a common mode voltage at the reader bond pads. The thermal sensor produces 228 a signal indicative of temperature. In some embodiments, the method shown in FIG. 6 additionally involves sensing 230 a change in head-medium spacing and/or head-medium contact using the thermal sensor signal.

Figure 7:
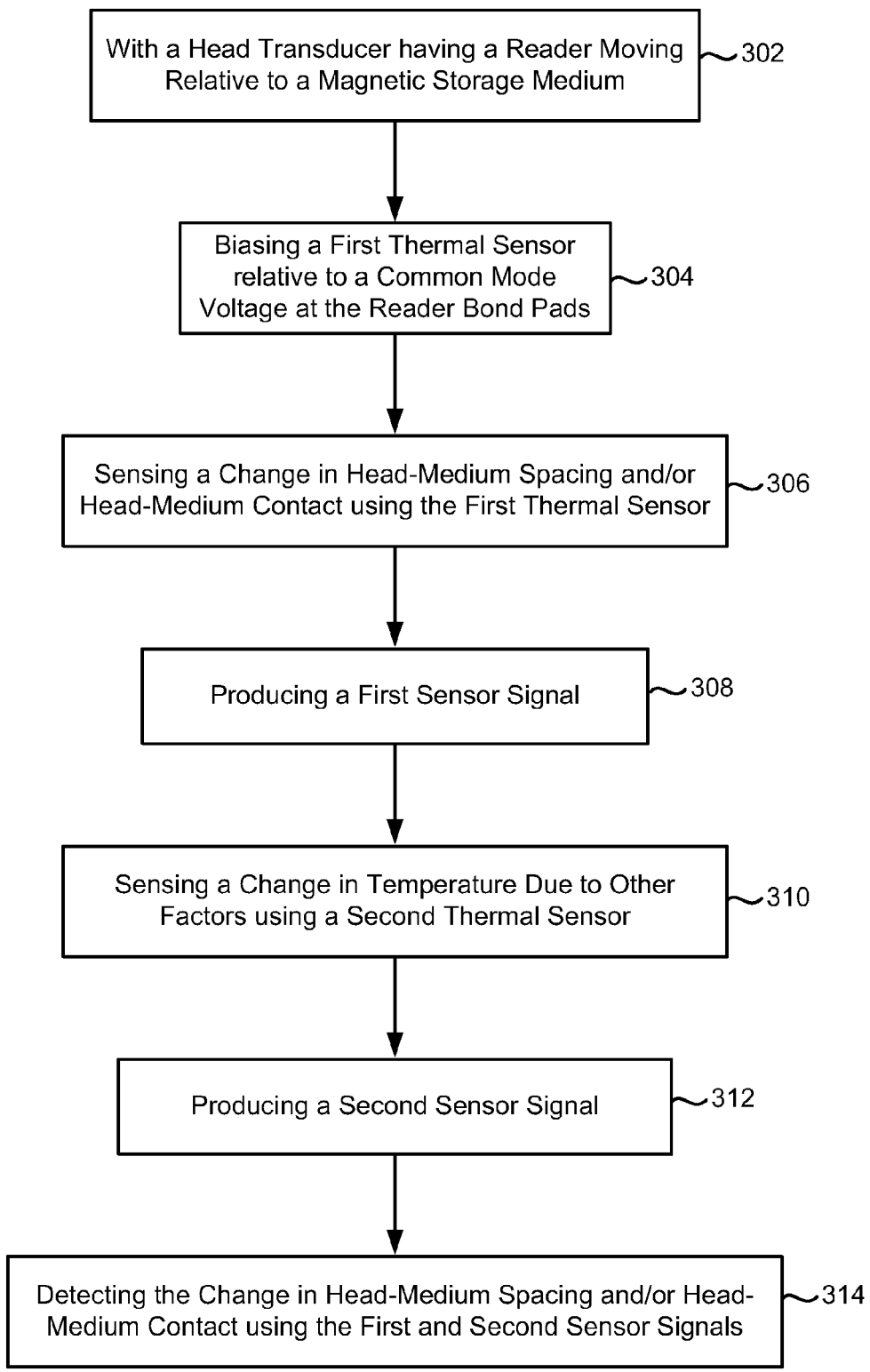
FIGS. 7-9 are flow charts showing various processes of methods for measuring temperature at a head transducer and detecting a change in head-medium spacing and/or head-medium contact using a multiplicity of thermal sensors in a pad neutral manner according to various embodiments.

FIG. 7 illustrates a method of detecting a change in head-medium spacing and/or head-medium contact in accordance with various embodiments. According to the embodiment shown in FIG. 7, and with a head transducer having a reader moving 302 relative to a magnetic storage medium, the method involves biasing 304 a first thermal sensor at the head transducer relative to a common mode voltage at bond pads of the reader. The method also involves sensing 306 a change in head-medium spacing and/or head-medium contact using the first thermal sensor, and, in response, producing 308 a first sensor signal. The method further involves sensing 310 for a change in temperature due to factors other than head-medium spacing or contact using a second thermal sensor and, in response, producing 312 a second sensor signal. The method also involves detecting 314 the change in a head-medium spacing and/or head-medium contact using the first and sensor signals.

Figure 8:
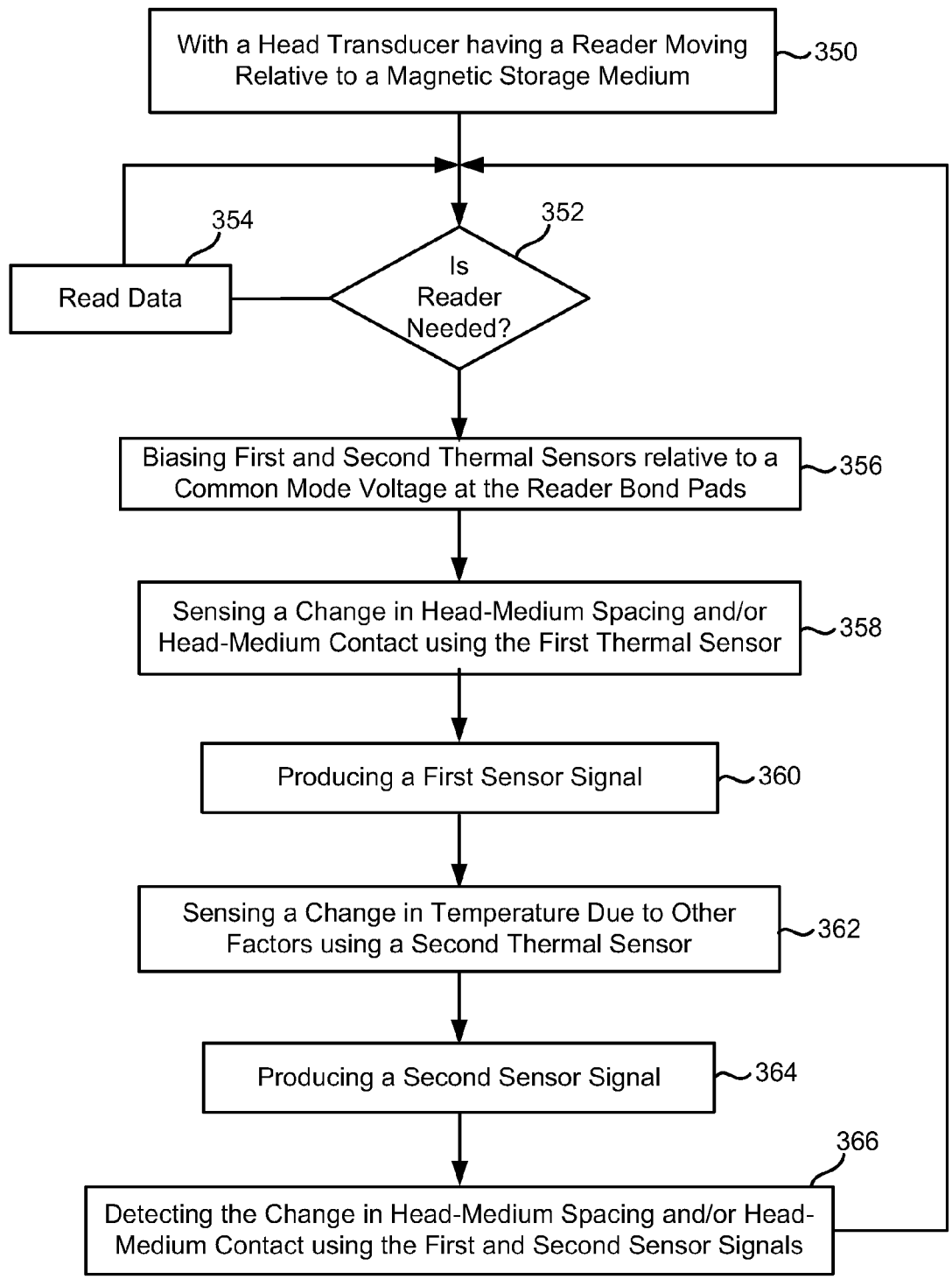

FIG. 8 illustrates a method of detecting a change in head-medium spacing and/or head-medium contact in accordance with other embodiments. According to the embodiment shown in FIG. 8, and with a head transducer having a reader moving 350 relative to a magnetic storage medium, a check is made 352 to determine if the reader is needed. If the reader is needed, the appropriate voltage is applied to the reader to implement a read operation 354. If the reader is not needed, a first thermal sensor and a second thermal sensor at the head transducer are biased 356 relative to a common mode voltage at the reader bond pads. The method involves sensing 358 for a change in head-medium spacing and/or head-medium contact using the first thermal sensor, and producing 360 a first sensor signal. The method also involves sensing 362 for a change in temperature due to factors other than head-medium spacing or contact using a second thermal sensor and, in response, producing 364 a second sensor signal. The method further involves detecting 366 the change in head-medium spacing and/or head-medium contact using the first and second sensor signals.

Figure 9:
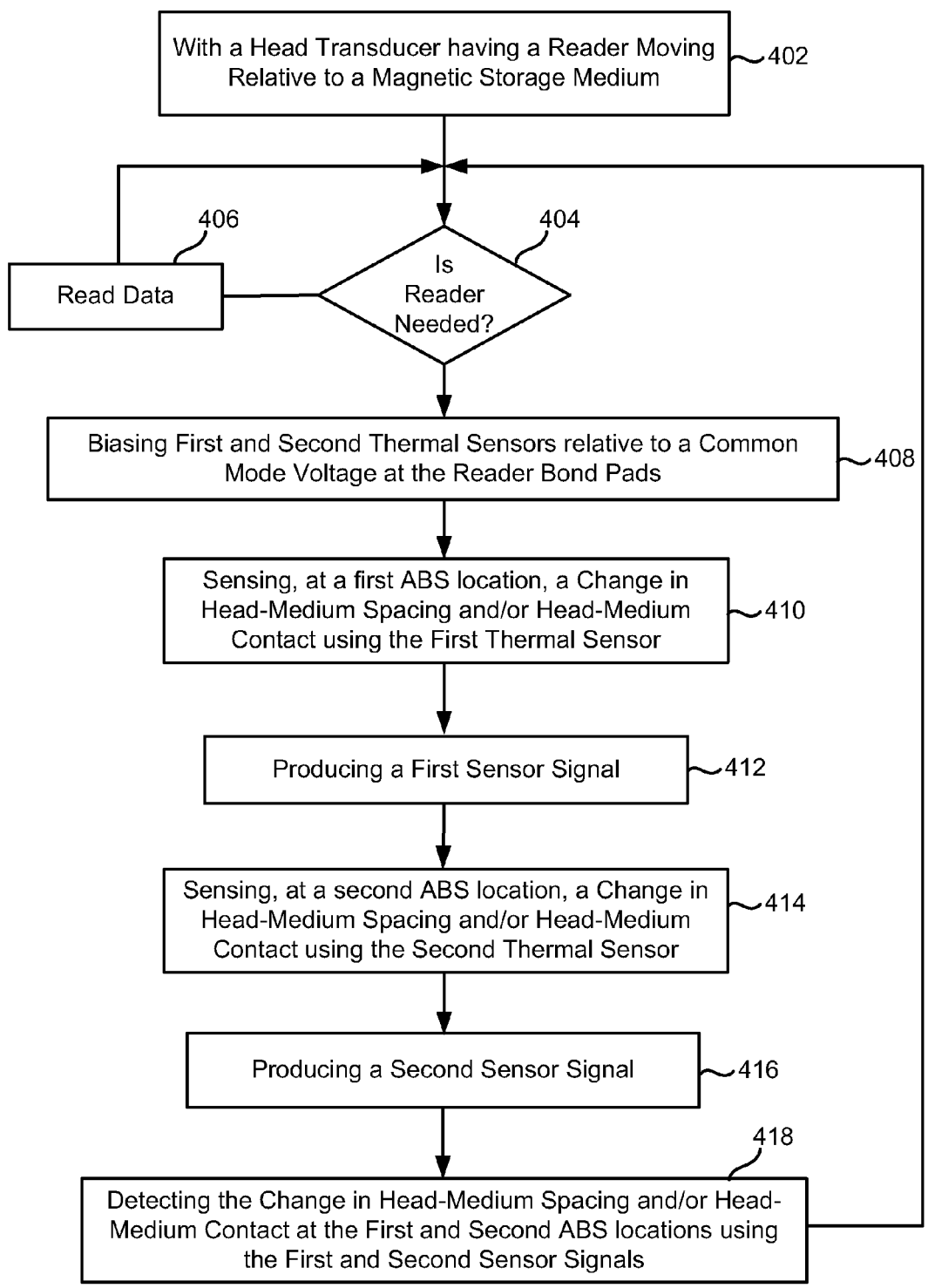

FIG. 9 illustrates a method of detecting a change in head-medium spacing and/or head-medium contact at two different locations of a transducer's airbearing surface (ABS) in accordance with further embodiments. According to the embodiment shown in FIG. 9, and with a head transducer having a reader moving 402 relative to a magnetic storage medium, a check is made 404 to determine if the reader is needed. If the reader is needed, the appropriate voltage is applied to the reader to implement a read operation 406. If the reader is not needed, a first thermal sensor and a second thermal sensor at the head transducer are biased 408 relative to a common mode voltage at the reader bond pads. It is understood that the number of thermal sensors biased by the reader bond pads can exceed two, such as between 3 and 8 sensors for example. The method involves sensing 410, at a first ABS location (e.g., a location at or near the writer), for a change in head-medium spacing and/or head-medium contact at or near the first ABS location using the first thermal sensor, and producing 412 a first sensor signal. The method also involves sensing 414, at a second ABS location (e.g., a location at or near the reader), for a change in head-medium spacing and/or head-medium contact at or near the second ABS location using the second thermal sensor, and producing 416 a second sensor signal. The method further involves detecting 418 the change in head-medium spacing and/or head-medium contact at the first and second ABS locations using the first and second sensor signals.

In accordance with some embodiments, including those discussed above, the first thermal sensor is situated at an air bearing surface of the transducer, such as at the close point. The second thermal sensor is preferably situated at or near the air bearing surface but away from the close point, such as at a location where the sensed temperature is not impacted by the thermal condition at the close point.

According to some embodiments, the first and/or second thermal sensors include one or more sensor elements having a temperature coefficient of resistance (TCR). In some embodiments, each thermal sensor has a positive TCR or a negative TCR. In other embodiments, one or more of the thermal sensors has a positive TCR and one or more of the other thermal sensors has a negative TCR. Other types of thermal sensors may be employed, such as a thermocouple or a thermistor, for example. Moreover, components other than thermal sensors can added to the head transducer and activated using reader bond pad biasing according to various embodiments disclosed herein.

Figure 10:
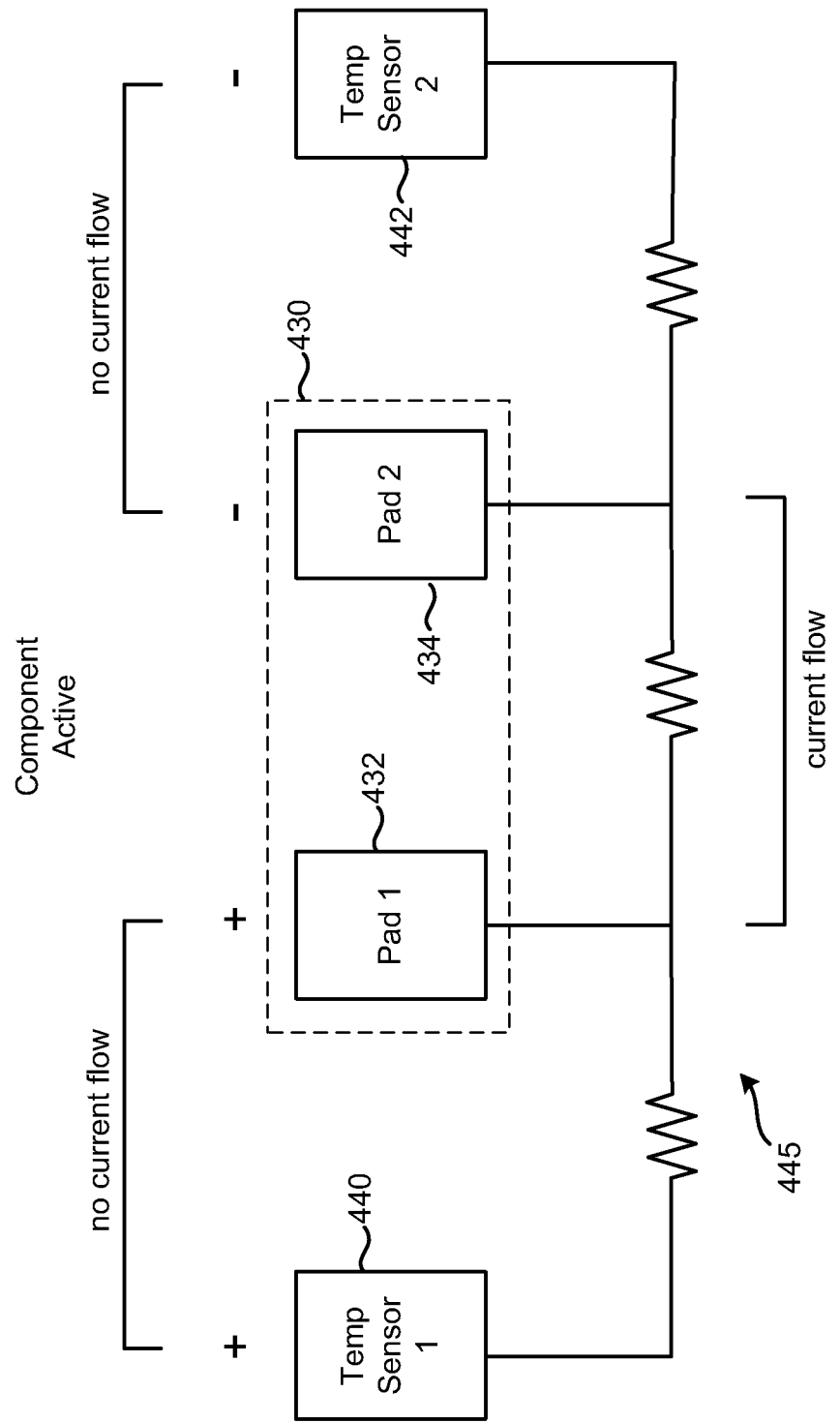
FIGS. 10 and 11 are block diagrams of various components of a head transducer that are configured to measure temperature at the head transducer and detect a change in head-medium spacing and/or head-medium contact using a multiplicity of thermal sensors in a pad neutral manner according to various embodiments.
Figure 11:
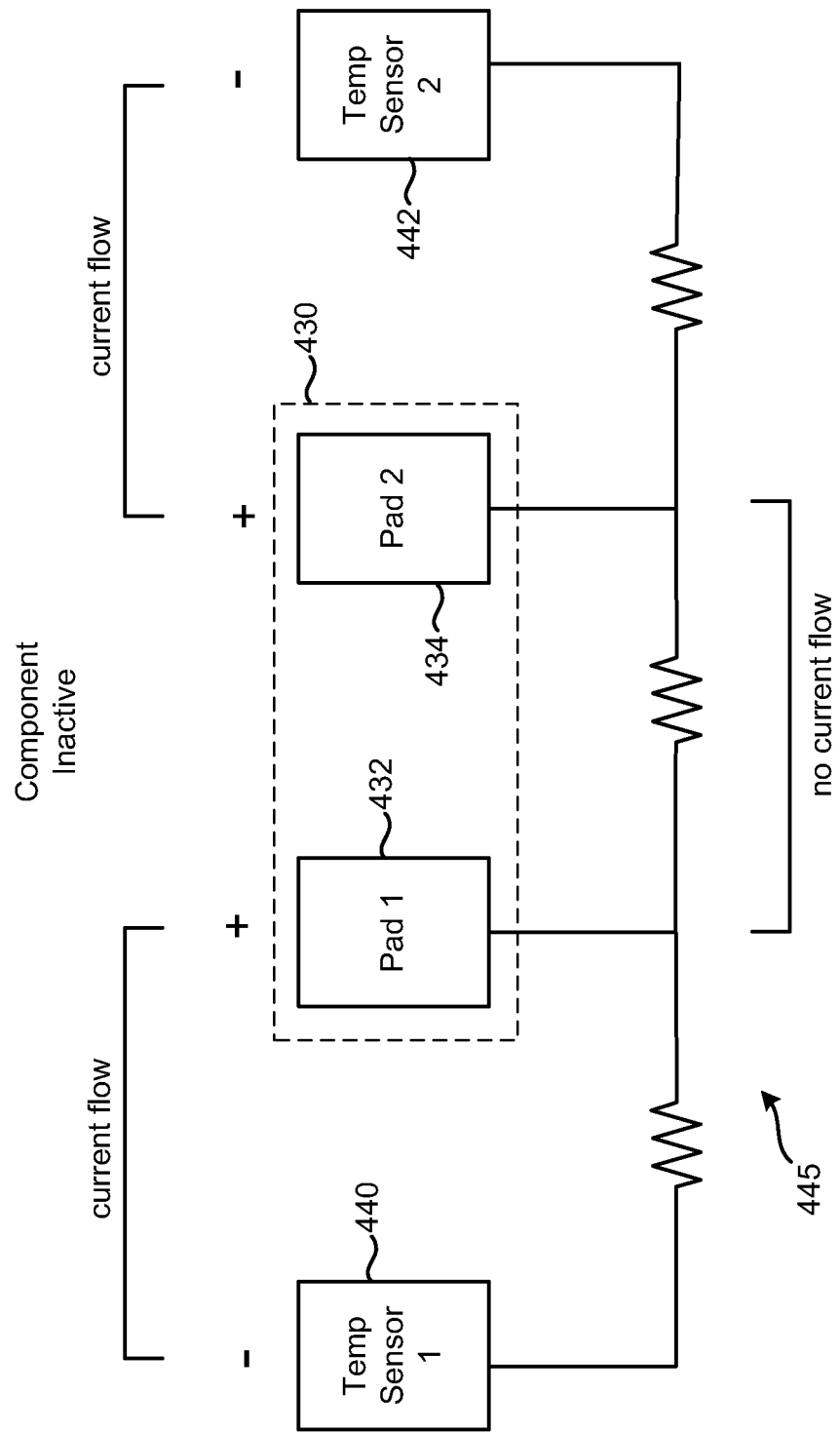

FIGS. 10 and 11 are block diagrams depicting a portion of a head transducer which includes an active component 430, a first thermal sensor 440 and a second thermal sensor 442. The component 430 is electrically coupled to bond pads 432 and 434 which provide a biasing voltage for the component 430. The component 430, the first thermal sensor 440, and the second thermal sensor 442 are coupled together via circuitry 445. As shown, component 430 and the first and second thermal sensors 440, 442 are resistively coupled to facilitate bond pad sharing in accordance with embodiments of the disclosure, which provides for selective activation and deactivation of these components 430, 440, and 442 using shared bond pads 432 and 434.

FIG. 10 shows a first mode of operation, in which the component 430 is biased by a differential voltage at bond pads 432 and 434 via circuitry 445. As shown in FIG. 10, a potential difference between bond pad 432 (at a higher potential, e.g., a positive voltage) and bond pad 434 (at a lower potential, e.g., a negative voltage) biases the component 430 for operation, while the two thermal sensors 440 and 442 are inactive. More particularly, the first thermal sensor 440 is held at substantially the same potential (e.g., about the same positive voltage) as that of bond pad 432 via the circuitry 445, such that essentially no current flows between the first thermal sensor 440 and bond pad 432. The second thermal sensor 442 is held at substantially the same potential (e.g., about the same negative voltage) as that of bond pad 434 via the circuitry 445, such that essentially no current flows between the second thermal sensor 442 and bond pad 434.

FIG. 11 shows a second mode of operation, in which the first and second thermal sensors 440 and 442 are biased relative to a common mode voltage at bond pads 432 and 434 via circuitry 445. FIG. 11 shows a potential difference between bond pad 432 (at a higher potential, e.g., a positive voltage) and the first thermal sensor 440 (at a lower potential, e.g., a negative voltage), which biases the first thermal sensor 440 for operation. FIG. 11 also shows a potential difference between bond pad 434 (at a higher potential, e.g., a positive voltage) and the second thermal sensor 442 (at a lower potential, e.g., a negative voltage), which biases the second thermal sensor 440 for operation. The component 430 in FIG. 11 is inactive, due to each of the bond pads 432 and 434 being held at substantially the same potential (e.g., about the same positive potential) via the circuitry 445, which results in a substantially zero potential between bond pads 432 and 434.

In some embodiments, the component 430 is a reader (read transducer) biased by a DC voltage at the bond pads 432 and 434. The thermal sensors 440 and 442 are configured to operate using the DC voltage at the bond pads 432 and 434. Suitable thermal sensors 440 and 442 are those that can operate using the DC voltage at the bond pads 432 and 434, such as TCR thermal sensors, for example. In other embodiments, the component 430 is a heater of the transducer, such as a reader heater or a writer heater for example. A heater is typically powered using a voltage waveform more complex than a DC voltage. For example, a heater is often powered by a stepped voltage waveform in which the biasing voltage to the heater is increased (or decreased) in a step-wise manner until a desired biasing voltage (and extent of airbearing surface protrusion) is achieved. The response of the thermal sensors 440 and 442 when powered by the heater is more complex, which complicates extraction of the desired sensor signal component for measuring spacing changes and detecting contact. Also, ground noise can be an issue when biasing the thermal sensors 440 and 442 using shared heater bond pads.

According to further embodiments, the component 430 is a writer of the transducer. A writer is typically powered using a voltage waveform more complex than that used to bias a reader or a heater. For example, a writer is often powered by a non-sinusoidal voltage waveform with an initial overshoot preceding the write waveform. It can be appreciated that the response of the thermal sensors 440 and 442 when powered by the writer is complex, which complicates extraction of the desired sensor signal component for measuring spacing changes and detecting contact. As such, the reader bond pads are generally more preferred than either the heater or writer bond pads for implementing bond pad sharing for powering a multiplicity of different active components of a transducer head in accordance with embodiments of the disclosure.

Also, although not necessary, greater design simplicity can be achieved by alternately biasing disparate components of a head transducer that share bond pads, such as in the manner described above with reference to FIGS. 10 and 11. According to some embodiments, disparate components of a head transducer that share bond pads can be biased for concurrent operation, rather than alternate or exclusive operation. In an embodiment in which one or more TCR thermal sensors share reader bond pads for concurrent operation, for example, loading of the TCR thermal sensors occurs because these sensors load the reader voltage. By use of proper filtering and different powering frequencies, concurrently operating disparate components of a head transducer that share bond pads can be achieved.

Figure 12:
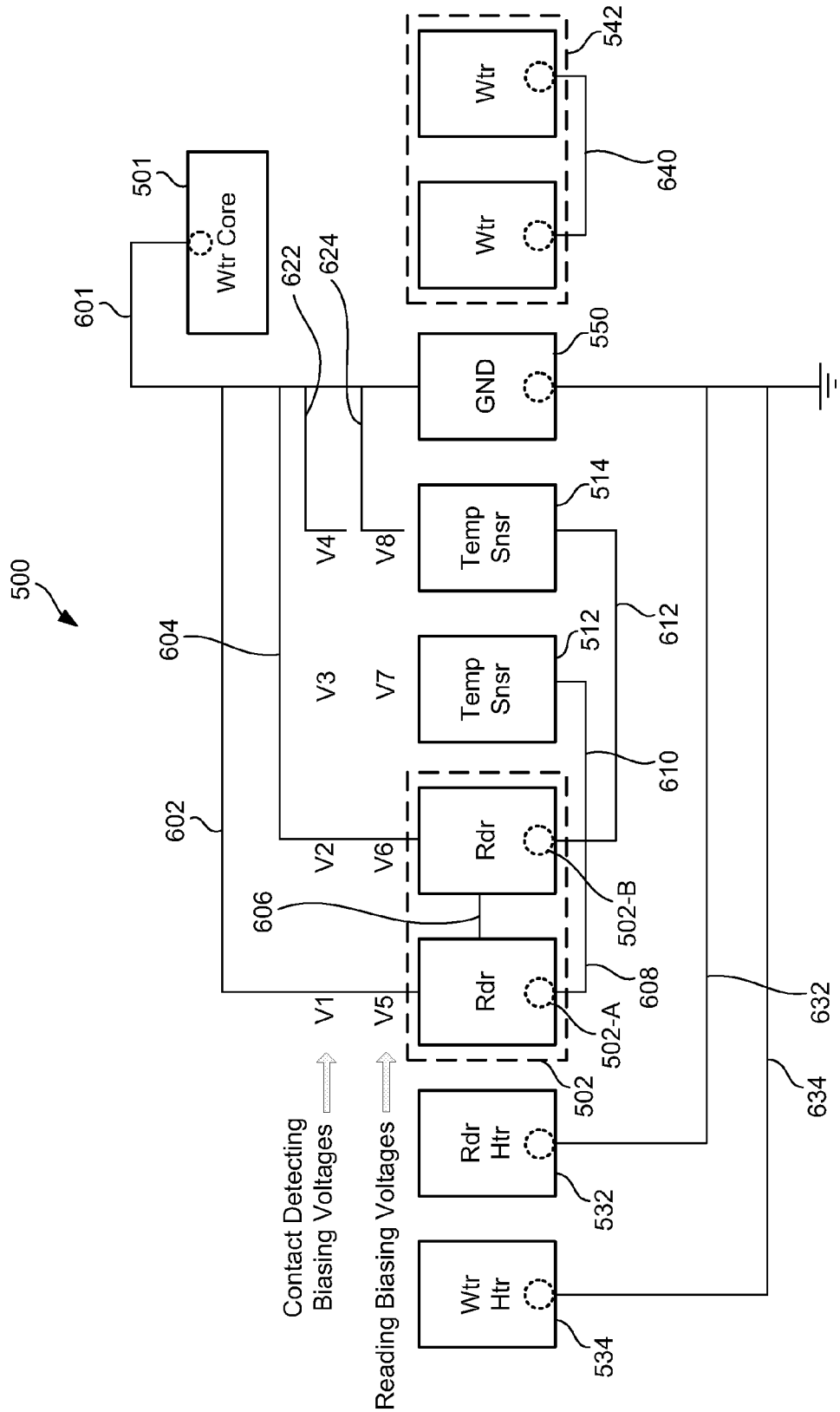
FIGS. 12 and 13 are schematics showing various components of a head transducer that are configured to measure temperature at the head transducer and detect a change in head-medium spacing and/or head-medium contact using a multiplicity of thermal sensors in a pad neutral manner according to various embodiments.

FIG. 12 is a schematic showing various components of a head transducer that are electrically coupled to enable contact detection using a multiplicity of thermal sensors in a pad neutral manner in accordance with various embodiments. The head transducer 500 shown in the illustrative embodiment of FIG. 12 provides for the addition of a multiplicity of thermal sensors to the head architecture without addition of further bond pads. The representative components of the head transducer 500 shown in FIG. 12 include a reader 502, a writer 542, a reader heater 532, a writer heater 534, a writer core 501, a first thermal sensor 512, and a second thermal sensor 514. The head transducer 500 also includes a ground 550. It can be seen in FIG. 12 that all of the head transducer components other than the first and second thermal sensors 512 and 514 have an associated bond pad or pads (indicated as dashed circles). It is understood that the bond pad or pads associated with each of these components can be located near or spaced apart from their respective components, and that the configuration shown in FIG. 12 is for illustrative purposes only. Rather than having a dedicated bond pad, each of the thermal sensors 512 and 514 are electrically coupled to one of a pair of bond pads 502-A and 502-B of the reader 502.

According to various embodiments, biasing circuitry of the head transducer 500 is configured to alternately activate and deactivate the reader 502 and the thermal sensors 512, 514 by adjusting the bias voltage on the reader bond pads. During a read operation, for example, the biasing circuitry is configured so that a potential difference is exclusively maintained on the reader 502, while substantially no potential difference is maintained on the first and second temperature sensors 512, 514. During contact detection, for example, the biasing circuitry is configured so that a potential difference is exclusively maintained on the first and second thermal sensors 512, 514, while substantially no potential difference is maintained on the reader 502. The biasing voltages and currents for the reader 502 and the first and second temperature sensors 512, 514 are tailored to each of these devices. Alternately energizing the reader 512 and thermal sensors 512, 514 in this manner provides for a multiplicity of thermal sensors (and/or other active components, such as contact pad charge detectors or additional readers) to be incorporated in the head transducer 500 without need for additional bond pads.

Example 1

In accordance with one embodiment, and with continued reference to FIG. 12, the biasing circuitry of the head transducer 500 comprises a writer core 501, a ground 550, and various electrical lines or traces each having a specified resistance. According to this embodiment, the resistance values of each of the electrical lines shown in FIG. 12 are listed in Table 1 below:

TABLE 1

| Electrical Line No. | Resistance (Ohms) |
|---|---|
| 601 | <10 |
| 602 | 20K |
| 604 | 250K |
| 606 | 1.5K |
| 608 | ~30 |
| 610 | ~100 |
| 612 | ~100 |
| 622 | 250K |
| 624 | 250K |
| 632 | 50 |
| 634 | 60 |
| 640 | 4-5 |

The biasing voltages V1-V4 associated with contact detection and the biasing voltages V5-V8 associated with data reading shown in FIG. 12 are listed in Table 2 below:

TABLE 2

| Biasing Voltage No. | Voltage (mV) |
|---|---|
| V1 | −150 |
| V2 | −150 |
| V3 | +150 |
| V4 | +150 |
| V5 | −70 |
| V6 | +70 |
| V7 | +70 |
| V8 | +70 |

Figure 13:
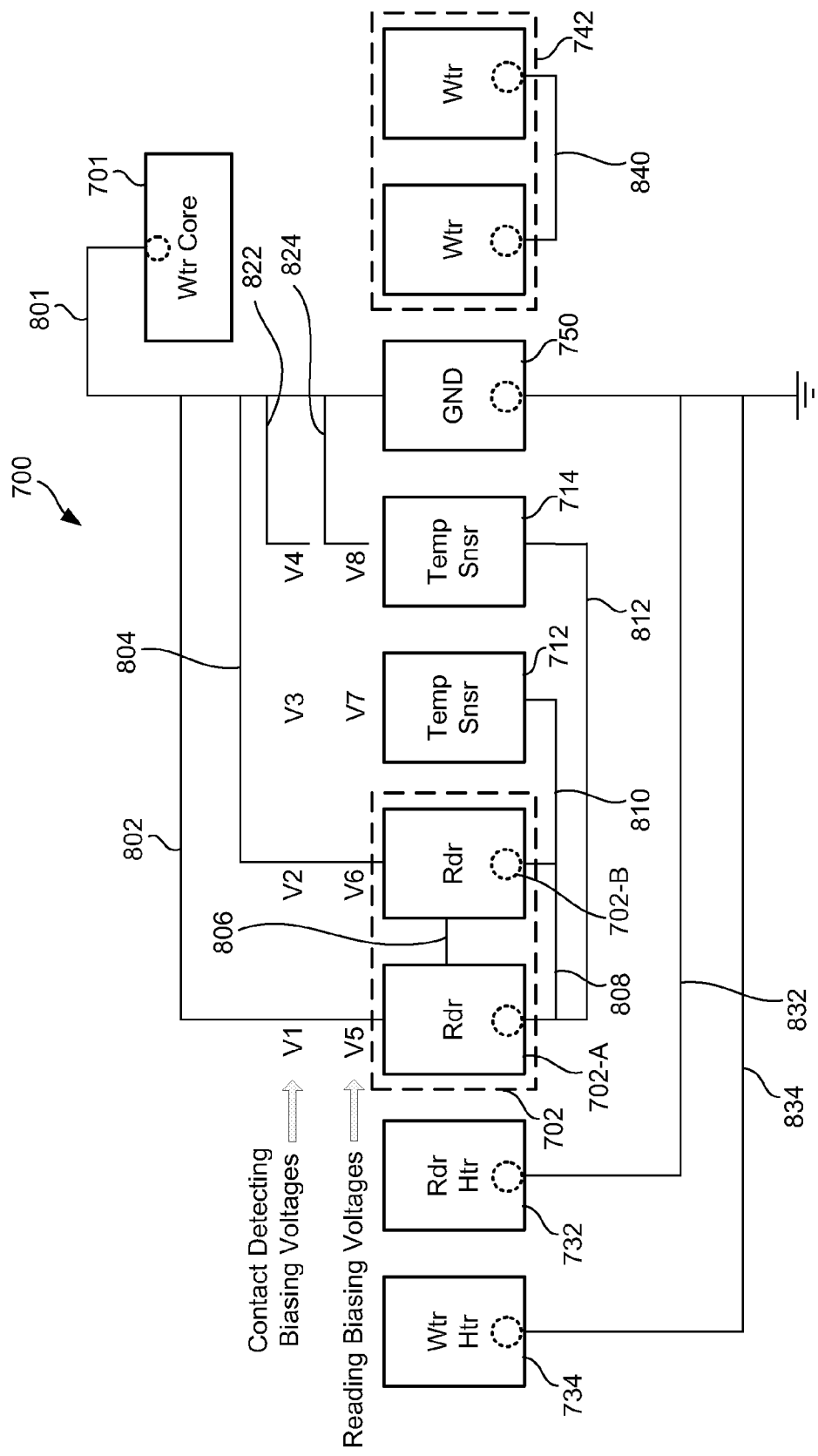

FIG. 13 is a schematic showing various components of a head transducer that are electrically coupled to enable contact detection using a multiplicity of thermal sensors in a pad neutral manner in accordance with other embodiments. The head transducer 700 shown in the illustrative embodiment of FIG. 13 provides for the addition of a multiplicity of thermal sensors to the head architecture without addition of further bond pads. The representative components of the head transducer 700 shown in FIG. 13 include a reader 702, a writer 742, a reader heater 732, a writer heater 734, a writer core 701, a first thermal sensor 712, and a second thermal sensor 714. The head transducer 700 also includes a ground 750. It can be seen in FIG. 13 that all of the head transducer components other than the first and second thermal sensors 712 and 714 have an associated bond pad or pads (indicated as dashed circles as in FIG. 12). Rather than having a dedicated bond pad, each of the thermal sensors 712 and 714 is electrically coupled to one of a pair of bond pads 702-A and 702-B of the reader 702.

According to various embodiments, biasing circuitry of the head transducer 700 is configured to alternately activate and deactivate the reader 702 and the thermal sensors 712, 714 by adjusting the bias voltage on the reader bond pads. During a read operation, for example, the biasing circuitry is configured so that a potential difference is exclusively maintained on the reader 702, while substantially no potential difference is maintained on the first and second temperature sensors 712, 714. During contact detection, for example, the biasing circuitry is configured so that a potential difference is exclusively maintained on the first and second thermal sensors 712, 714, while substantially no potential difference is maintained on the reader 702. Alternately energizing the reader 712 and thermal sensors 712, 714 in this manner provides for a multiplicity of thermal sensors (and/or other active components) to be incorporated in the head transducer 700 without need for additional bond pads.

Example 2

In accordance with another embodiment, and with continued reference to FIG. 13, the biasing circuitry of the head transducer 700 comprises a writer core 701, a ground 750, and various electrical lines or traces each having a specified resistance. According to this embodiment, the resistance values of each of the electrical lines shown in FIG. 13 are listed in Table 3 below:

TABLE 3

| Electrical Line No. | Resistance (Ohms) |
|---|---|
| 801 | <10 |
| 802 | 20K |
| 804 | 250K |
| 806 | 1.5K |
| 808 | ~30 |
| 810 | ~100 |
| 812 | ~100 |
| 822 | 250K |
| 824 | 250K |
| 832 | 50 |
| 834 | 60 |
| 840 | 4-5 |

The biasing voltages V1-V4 associated with contact detection and the biasing voltages V5-V8 associated with data reading shown in FIG. 13 are listed in Table 4 below:

TABLE 4

| Biasing Voltage No. | Voltage (mV) |
|---|---|
| V1 | −150 |
| V2 | −150 |
| V3 | +150 |
| V4 | +150 |
| V5 | −70 |
| V6 | +70 |
| V7 | +70 |
| V8 | −70 |

According to various embodiments, head-medium spacing change and/or head-medium contact can be detected using the reader bond pad sharing embodiments disclosed herein. In some embodiments, the first and second thermal sensors (e.g., sensor 512 and 514 in FIG. 12; sensors 712 and 714 in FIG. 13) have different signs of TCR, one positive and the other negative. The signals produced by the first and second thermal sensors can be summed to produce a combined output signal indicative of head-medium spacing change and/or head-medium contact. In other embodiments, the first and second thermal sensor have the same signs of TCR, and a summer is configured to produce a combined output signal indicative of head-medium spacing change and/or head-medium contact. In some embodiments, the first and second thermal sensors are arranged to define a differential resistance temperature sensor. Circuitry can be configured to combine the first and second sensor signals to produce a differential signal indicative of one or both of the change in head-medium spacing and head-medium contact.

According to some embodiments, a heater is configured to actuate the head transducer to cause the thermal sensor situated at or near the close point to move toward the magnetic storage medium. Circuitry can be configured to subtract a component of the combined first and second thermal sensor signals indicative of an effect of the heater on the combined sensor signal. The resulting signal can be used to detect one or both of the change in head-medium spacing and head-medium contact. In various embodiments, the thermal sensor situated at or near the close point produces a non-linear sensor signal in response to temperature change at or near the close point, and the thermal sensor spaced away from the close point produces a linear sensor signal in response to temperature change at a spaced-away location.

The first thermal sensor is preferably located on the slider of the head transducer at or near the close point, and the signal produced by the first thermal sensor is indicative of a thermal boundary condition at the close point. The second thermal sensor is preferably located on the head transducer away from the close point, and the signal produced by the second thermal sensor is indicative of temperature change due to factors other than those influenced by the thermal boundary condition at the close point. Other representative techniques for detecting head-medium spacing change and/or head-medium contact that can be adapted for use in various embodiments disclosed herein are disclosed in commonly owned, co-pending U.S. Patent Application Publication Nos. 2012/0113207 and 2012/0120522, previously incorporated herein by reference.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a head transducer comprising a reader connected to reader bond pads and configured to interact with a magnetic storage medium;
a sensor connected to the reader bond pads and configured to produce a sensor signal; and
biasing circuitry coupled to the reader and the sensor, the biasing circuitry configured to alternately bias the reader and the sensor for reading and temperature sensing operations, respectively.

2. The apparatus of claim 1, wherein:
during a read operation, a voltage across the sensor is substantially zero; and
during a spacing measurement or contact detection, a voltage across the reader is substantially zero.

3. The apparatus of claim 1, wherein:
the head transducer comprises a heater configured to thermally actuate the head transducer; and
the sensor is situated proximate the heater.

4. The apparatus of claim 1, wherein the sensor is biased relative to a common mode voltage at the reader bond pads at times when the reader is inactive for reading.

5. The apparatus of claim 1, wherein a change in the sensor signal is indicative of one or both of a change in head-medium spacing and head-medium contact.

6. The apparatus of claim 1, wherein the sensor comprises a thermal sensor.

7. The apparatus of claim 1, wherein the sensor has a temperature coefficient of resistance (TCR).

8. The apparatus of claim 1, wherein the sensor comprises a contact pad charge detector or a secondary reader.

9. An apparatus, comprising:
a head transducer comprising a reader coupled to reader bond pads and configured to interact with a magnetic storage medium;
a first thermal sensor configured to produce a first sensor signal, the first sensor biased relative to a common mode voltage at the reader bond pads;
a second thermal sensor configured to produce a second sensor signal;
one of the first and second sensors situated at or near a close point of the head transducer in relation to the magnetic storage medium, and the other of the first and second sensors spaced away from the close point; and
circuitry configured to combine the first and second sensor signals and produce a combined sensor signal indicative of one or both of a change in head-medium spacing and head-medium contact.

10. The apparatus of claim 9, wherein:
during a read operation, a voltage across the first thermal sensor is substantially zero; and
during a spacing measurement or contact detection, a voltage across the reader is substantially zero.

11. The apparatus of claim 9, wherein the first thermal sensor and the second thermal sensor are respectively biased relative to the common mode voltage at the reader bond pads.

12. The apparatus of claim 11, wherein:
during a read operation, a voltage respectively across the first and second thermal sensors is substantially zero; and
during a spacing measurement or contact detection, a voltage across the reader is substantially zero.

13. The apparatus of claim 9, wherein:
the thermal sensor situated at or near the close point is configured to generate a sensor signal with a predominate signal component indicative of a thermal boundary condition at the close point; and
the thermal sensor spaced away from the close point is configured to generate a sensor signal with a predominate signal component indicative of a change in temperature due to factors other than those influenced by the thermal boundary condition at the close point.

14. The apparatus of claim 9, wherein the first and second thermal sensors each have a temperature coefficient of resistance.

15. The apparatus of claim 9, wherein:
one of the first and second thermal sensors has a positive temperature coefficient of resistance (TCR); and
the other of the first and second thermal sensors has a negative TCR.

16. The apparatus of claim 9, wherein the first and second thermal sensors are arranged to define a differential resistance temperature sensor.

17. A method, comprising:
with a head transducer comprising a reader coupled to reader bond pads and moving relative to a magnetic storage medium:
biasing a first thermal sensor of the head transducer relative to a common mode voltage at the reader bond pads; and
detecting one or both of a change in head-medium spacing and head-medium contact using a sensor signal produced by the first thermal sensor.

18. The method of claim 17, wherein biasing the first thermal sensor comprises exclusively biasing the first thermal sensor relative to the common mode voltage at the reader bond pads at times when the reader is not needed for a read operation.

19. The method of claim 17, further comprising:
sensing for a change in temperature due to factors other than head-medium spacing change and head-medium contact using a second thermal sensor at the transducer head;
producing a first sensor signal by the first thermal sensor and a second sensor signal by the second thermal sensor; and
detecting one or both of the change in head-medium spacing and head-medium contact using the first and second sensor signals.

20. The method of claim 19, further comprising biasing the second thermal sensor relative to the common mode voltage at the reader bond pads.

21. The method of claim 20, wherein biasing the first and second thermal sensor comprises biasing the first and second thermal sensors relative to the common mode voltage at the reader bond pads at times when the reader is not needed for a read operation.

22. The method of claim 20, wherein:
biasing the first and second thermal sensor comprises exclusively biasing the first and second thermal sensors relative to the common mode voltage at the reader bond pads at times when the reader is not needed for a read operation; and
the method further comprises exclusively biasing the reader by a voltage across the reader bond pads at times when the reader is needed for a read operation.

* * * * *